United States Patent
Masui

(10) Patent No.: US 12,145,574 B2
(45) Date of Patent: Nov. 19, 2024

(54) VEHICLE CONTROL METHOD, VEHICLE CONTROL SYSTEM, AND VEHICLE CONTROL PROGRAM

(71) Applicant: TOYOTA JIDOSHA KABUSHIKI KAISHA, Toyota (JP)

(72) Inventor: Hiroyoshi Masui, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 432 days.

(21) Appl. No.: 17/578,902

(22) Filed: Jan. 19, 2022

(65) Prior Publication Data

US 2022/0266818 A1    Aug. 25, 2022

(30) Foreign Application Priority Data

Feb. 19, 2021 (JP) ................... 2021-025459

(51) Int. Cl.
*B60W 30/06* (2006.01)
*B60W 60/00* (2020.01)

(52) U.S. Cl.
CPC ........ *B60W 30/06* (2013.01); *B60W 60/0025* (2020.02); *B60W 2554/4041* (2020.02); *B60W 2554/80* (2020.02)

(58) Field of Classification Search
CPC ............ B60W 30/06; B60W 60/0025; B60W 2554/4041; B60W 2554/80; B60W 40/00; B60W 40/10; B62D 15/0285
See application file for complete search history.

(56) References Cited

U.S. PATENT DOCUMENTS

| | | | |
|---|---|---|---|
| 2018/0095474 A1* | 4/2018 | Batur | G01S 13/867 |
| 2018/0194344 A1* | 7/2018 | Wang | G05D 1/027 |
| 2018/0292832 A1* | 10/2018 | Bae | B60W 30/06 |
| 2021/0009144 A1* | 1/2021 | Ke | B60W 30/095 |
| 2021/0180979 A1 | 6/2021 | Kitahara | |
| 2022/0063599 A1* | 3/2022 | Prinzhausen | B60W 30/143 |

FOREIGN PATENT DOCUMENTS

| | | |
|---|---|---|
| JP | 2008-287572 A | 11/2008 |
| JP | 2015-041348 A | 3/2015 |
| JP | 2020-038359 A | 3/2020 |

* cited by examiner

*Primary Examiner* — Harry Y Oh
*Assistant Examiner* — Danielle M Jackson
(74) *Attorney, Agent, or Firm* — Dinsmore & Shohl LLP

(57) ABSTRACT

A vehicle control method controls a vehicle adapted to automated valet parking in a parking lot. The vehicle control method includes a localization process of estimating a vehicle position of the vehicle in the parking lot based on a detection result by a sensor mounted on the vehicle. The vehicle control method further includes a process of accumulating an estimation error of the vehicle position estimated through the localization process. The vehicle control method further includes a first margin setting process of setting a margin distance to be longer than a default value by a correction value that reflects a variance of distribution of the estimation error. The vehicle control method further includes a vehicle stop process of controlling the vehicle such that the vehicle stops the margin distance before a specified stop position in the parking lot based on the vehicle position estimated through the localization process.

7 Claims, 13 Drawing Sheets

VEHICLE CONTROL METHOD, VEHICLE CONTROL SYSTEM, AND VEHICLE CONTROL PROGRAM

CROSS-REFERENCE TO RELATED APPLICATION

This application claims priority to Japanese Patent Application No. 2021-025459 filed on Feb. 19, 2021, incorporated herein by reference in its entirety.

BACKGROUND

1. Technical Field

The present disclosure relates to a technique for controlling a vehicle adapted to automated valet parking (AVP) in a parking lot.

2. Description of Related Art

A "localization process (self-position estimation process, localization)" in which a vehicle estimates its own position using map information and in-vehicle sensors is known. Specifically, the map information includes the positions of landmarks such as signs. The vehicle uses the in-vehicle sensors to roughly calculate the vehicle position and recognize the surrounding landmarks. The vehicle position is estimated with high accuracy by combining the rough vehicle position, the landmark positions indicated by the map information, and the relative positions of the landmarks recognized by the in-vehicle sensors.

Japanese Unexamined Patent Application Publication No. 2020-038359 (JP 2020-038359 A) discloses a map system for generating or updating map data including coordinate information of a plurality of landmarks used in a localization process.

Japanese Unexamined Patent Application Publication No. 2015-041348 (JP 2015-041348 A) discloses a parking guidance device that is mounted on a vehicle and performs automated parking of the vehicle. In automated parking, various guide signs drawn on the road surface are used. For example, a stop position marker indicates a stop space for the vehicle where the driver gets into the vehicle. The parking guidance device recognizes the stop position marker using an in-vehicle camera, and guides the vehicle to the stop frame included in the stop position marker to cause the vehicle to stop.

Japanese Unexamined Patent Application Publication No. 2008-287572 (JP 2008-287572 A) discloses a vehicle driving support system for stopping a vehicle at the stop line in front of an intersection. The in-vehicle device detects the stop line from the image captured by the camera and supports the driving of the vehicle such that the vehicle stops at the detected stop line. In order to improve the detection accuracy of the stop line, the in-vehicle device acquires information on the distance to the stop line from the optical beacon and the on-road device installed before the stop line. The in-vehicle device acquires measurement errors of the range finder that measures the traveling distance, based on distances to the stop line that are acquired at different positions. Further, the in-vehicle device calculates the error range of the traveling distance when the vehicle travels to the stop line, based on the measurement errors of the range finder. Then, the in-vehicle device determines a search area for searching for the stop line in the captured image based on the error range of the traveling distance.

SUMMARY

An automated valet parking service in a parking lot is known. A vehicle adapted to the automated valet parking travels autonomously at least in the parking lot. During autonomous driving, the vehicle performs a localization process of estimating its own position using parking lot map information and in-vehicle sensors. Then, the vehicle performs vehicle travel control based on the estimated vehicle position.

When it is necessary to stop the vehicle during autonomous traveling in the parking lot, the automated valet parking system instructs the vehicle to stop before the specified stop position (stop node). In response to the stop instruction, the vehicle performs vehicle travel control (braking control) such that the vehicle stops before the specified stop position. However, when the accuracy of the localization process is not high, the vehicle may not stop before the specified stop position and may exceed the specified stop position.

An object of the present disclosure is to provide a technique capable of suppressing a vehicle adapted to automated valet parking in a parking lot from exceeding a specified stop position when stopping the vehicle.

A first aspect of the present disclosure relates to a vehicle control method for controlling a vehicle adapted to automated valet parking in a parking lot. The vehicle control method includes: a localization process of estimating a vehicle position of the vehicle in the parking lot based on a detection result by a sensor mounted on the vehicle; a process of accumulating an estimation error of the vehicle position estimated through the localization process; a first margin setting process of setting a margin distance to be longer than a default value by a correction value that reflects a variance of distribution of the estimation error; and a vehicle stop process of controlling the vehicle such that the vehicle stops the margin distance before a specified stop position in the parking lot based on the vehicle position estimated through the localization process.

A second aspect of the present disclosure relates to a vehicle control system for controlling a vehicle adapted to automated valet parking in a parking lot. The vehicle control system includes: one or more processors that perform a localization process of estimating a vehicle position of the vehicle in the parking lot based on a detection result by a sensor mounted on the vehicle; and one or more storage devices that store localization error information indicating distribution of an estimation error of the vehicle position estimated through the localization process. The one or more processors further perform a first margin setting process of setting a margin distance to be longer than a default value by a correction value that reflects a variance of distribution of the estimation error, and a vehicle stop process of controlling the vehicle such that the vehicle stops the margin distance before a specified stop position in the parking lot based on the vehicle position estimated through the localization process.

A third aspect of the present disclosure relates to a vehicle control program for controlling a vehicle adapted to automated valet parking in a parking lot. The vehicle control program causing a computer to execute a localization process of estimating a vehicle position of the vehicle in the parking lot based on a detection result by a sensor mounted on the vehicle, a process of accumulating an estimation error of the vehicle position estimated through the localization process, a first margin setting process of setting a margin distance to be longer than a default value by a correction value that reflects a variance of distribution of the estimation error, and a vehicle stop process of controlling the vehicle such that the vehicle stops the margin distance before a specified stop position in the parking lot based on the vehicle position estimated through the localization process.

According to the present disclosure, in the vehicle stop process, the vehicle is controlled to stop the margin distance before the specified stop position. The vehicle stop control is performed based on the vehicle position estimated through the localization process. In the first margin setting process, the margin distance is set to be longer than the default value by the correction value. The correction value is a parameter that reflects the variance of the distribution of the estimation error of the vehicle position estimated through the localization process. By using the margin distance set in the first margin setting process, it is possible to suppress the vehicle from exceeding the specified stop position even if the accuracy of the localization process decreases. That is, it is possible to more reliably stop the vehicle before the specified stop position.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described with reference to the accompanying drawings.

1. Overview of Automated Valet Parking System

Figure 1:
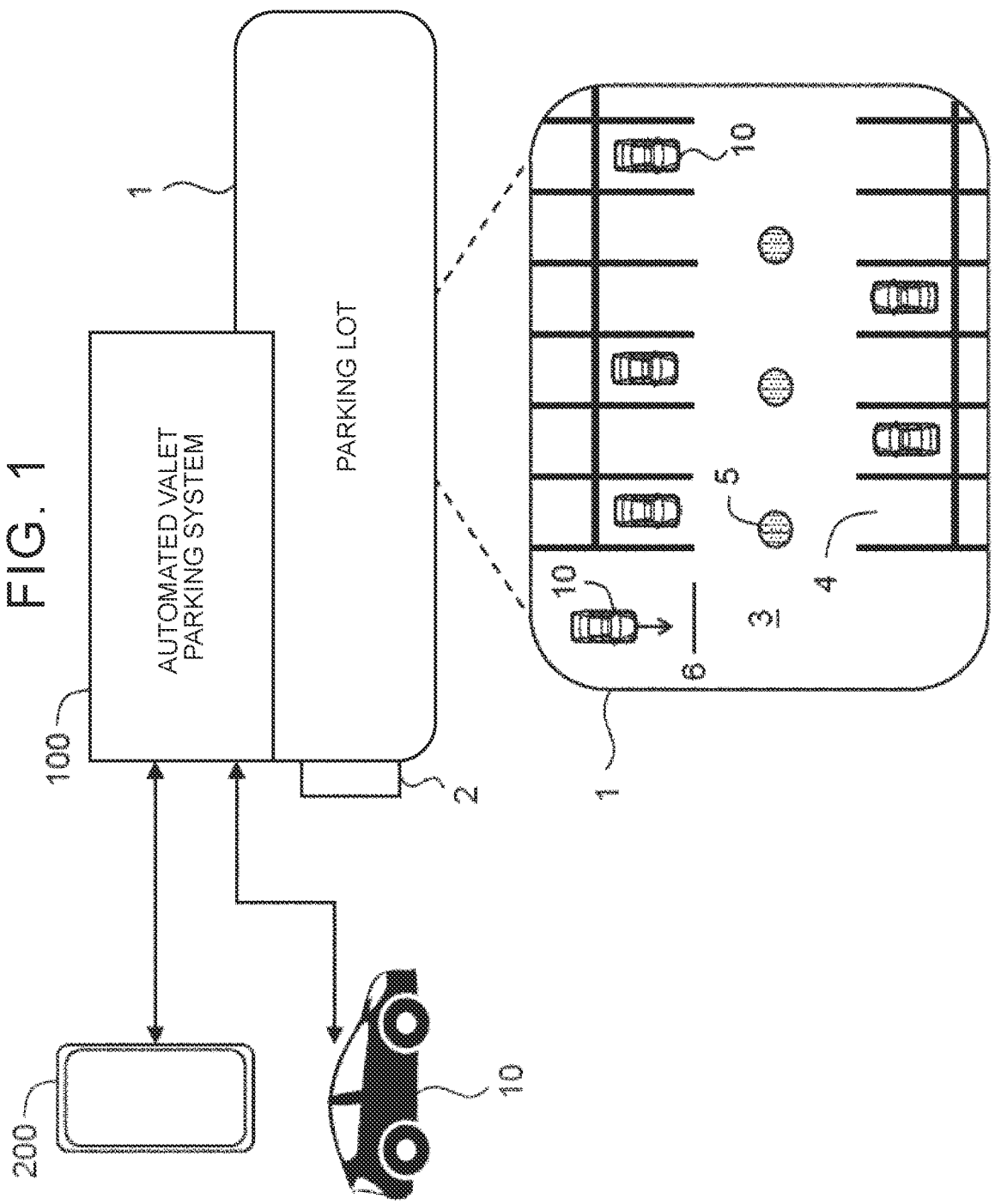
FIG. 1 is a conceptual diagram illustrating an overview of an automated valet parking system according to an embodiment of the present disclosure.

FIG. 1 is a conceptual diagram illustrating an overview of an automated valet parking system 100 according to the present embodiment. The automated valet parking system 100 manages an automated valet parking (AVP) service in a parking lot 1.

A vehicle adapted to automated valet parking will be hereinafter referred to as "AVP vehicle 10". The AVP vehicle 10 can communicate with the automated valet parking system 100. The AVP vehicle 10 can also travel without driving operation by the driver at least in the parking lot 1. The AVP vehicle 10 may be an autonomous driving vehicle. When a vehicle having no autonomous traveling function is towed by an autonomous traveling robot to realize the automated valet parking, the combination of the vehicle and the autonomous traveling robot corresponds to the "AVP vehicle 10", and control of the AVP vehicle 10 means control of the autonomous traveling robot.

The parking lot 1 is used by at least the AVP vehicle 10. The parking lot 1 may be used by a general vehicle other than the AVP vehicle 10.

The parking lot 1 includes a boarding-alighting area 2, a passageway 3, and a plurality of parking slots (parking sections) 4. In the boarding-alighting area 2, the AVP vehicle 10 entering the parking lot 1 or the AVP vehicle 10 exiting the parking lot 1 stops. In the boarding-alighting area 2, an occupant gets off the AVP vehicle 10 and also gets into the AVP vehicle 10. The passageway 3 is an area in which vehicles such as the AVP vehicle 10 and a general vehicle travel. The parking slot 4 is a space for parking a vehicle such as the AVP vehicle 10 or a general vehicle. For example, the parking slots 4 are separated by demarcation lines.

In addition, a plurality of landmarks 5 are provided in the parking lot 1. The landmarks 5 are used to guide the AVP vehicle 10 in the parking lot 1. Examples of the landmarks 5 include markers, pillars, and the like.

Further, a stop node 6 is provided in the parking lot 1. The stop node 6 indicates a "specified stop position" at which the AVP vehicle 10 should stop. For example, the stop node 6 is set at a position adjacent to the boarding-alighting area 2. As another example, the stop node 6 is set at a position adjacent to an intersection in the parking lot 1. The stop node 6 may be represented by a stop line.

Hereinafter, an example of the flow in which a user X uses the automated valet parking service will be described. It is assumed that the member information of the user X is registered in advance in the automated valet parking system 100.

First, the user X makes a reservation for automated valet parking. For example, the user X operates a terminal device 200 to input ID information of the user X, a desired parking lot 1, a desired date of use, a desired time of use (desired entrance time and desired exit time), and the like. The terminal device 200 transmits reservation information including the input information to the automated valet parking system 100. The automated valet parking system 100 performs a reservation process based on the reservation information and transmits a reservation completion notice to the terminal device 200. The automated valet parking system 100 also transmits authentication information corresponding to the reservation information to the terminal device 200. The terminal device 200 receives the authentication information and holds the received authentication information.

The entrance (check-in) of the AVP vehicle 10 into the parking lot 1 is as follows.

The AVP vehicle 10 carrying the user X arrives at the boarding-alighting area 2 of the parking lot 1 and stops. In the boarding-alighting area 2, the user X (and other occupants, if any) gets off the AVP vehicle 10. Then, the user X requests entrance of the AVP vehicle 10 using the authentication information held in the terminal device 200. In response to the entrance request, the automated valet parking system 100 authenticates the user X. When the authentication is completed, the operation authority of the AVP vehicle 10 is transferred from the user X to the automated valet parking system 100. The automated valet parking system 100 performs an entrance process for the AVP vehicle 10.

In the entrance process, the automated valet parking system 100 communicates with the AVP vehicle 10 and activates the AVP vehicle 10 (ignition ON).

Further, the automated valet parking system 100 allocates a vacant parking slot 4 to the AVP vehicle 10 with reference to the usage status of the parking lot 1. Then, the automated valet parking system 100 communicates with the AVP vehicle 10 and provides an entrance instruction to the AVP vehicle 10. The entrance instruction includes information of the allocated parking slot 4 and map information of the parking lot 1. The automated valet parking system 100 may specify a travel route from the boarding-alighting area 2 to the allocated parking slot 4. In that case, the entrance instruction includes information on the specified travel route.

In response to the entrance instruction, the AVP vehicle 10 starts vehicle travel control. Specifically, the AVP vehicle 10 autonomously travels in the passageway 3 from the boarding-alighting area 2 to the allocated parking slot 4, and autonomously parks in the allocated parking slot 4. At this time, the AVP vehicle 10 may travel along the travel route specified by the automated valet parking system 100. The automated valet parking system 100 may communicate with the AVP vehicle 10 and remotely control the autonomous traveling of the AVP vehicle 10.

When parking is completed, the AVP vehicle 10 notifies the automated valet parking system 100 of the completion of parking. Alternatively, the automated valet parking system 100 may detect that the completion of parking of the AVP vehicle 10 using infrastructure sensors installed in the parking lot 1. After the parking is completed, the automated valet parking system 100 communicates with the AVP vehicle 10 and stops the operation of the AVP vehicle 10 (ignition OFF). The automated valet parking system 100 holds the information of the parking slot 4 of the AVP vehicle 10 in association with the user X.

The exit (check-out) of the AVP vehicle 10 from the parking lot 1 is as follows.

The user X requests exit of the AVP vehicle 10 using the terminal device 200. The exit request includes the authentication information, the information on the boarding-alighting area 2 specified by the user X, and the like. In response to the exit request, the automated valet parking system 100 authenticates the user X and performs an exit process for the AVP vehicle 10.

In the exit process, the automated valet parking system 100 communicates with the AVP vehicle 10 and activates the AVP vehicle 10 (ignition ON).

The automated valet parking system 100 communicates with the AVP vehicle 10 and provides an exit instruction to the AVP vehicle 10. The exit instruction includes the information on the boarding-alighting area 2 specified by the user X and the map information of the parking lot 1. The automated valet parking system 100 may specify a travel route from the parking slot 4 to the specified boarding-alighting area 2. In that case, the exit instruction includes the information on the specified travel route.

In response to the exit instruction, the AVP vehicle 10 starts the vehicle travel control. Specifically, the AVP vehicle 10 autonomously travels in the passageway 3 from the parking slot 4 to the specified boarding-alighting area 2. At this time, the AVP vehicle 10 may travel along the travel route specified by the automated valet parking system 100. The automated valet parking system 100 may communicate with the AVP vehicle 10 and remotely control the autonomous traveling of the AVP vehicle 10.

The AVP vehicle 10 arrives at the boarding-alighting area 2 specified by the user X and stops. The operation authority of the AVP vehicle 10 is transferred from the automated valet parking system 100 to the user X. The user X (and other occupants, if any) gets into the AVP vehicle 10. The AVP vehicle 10 starts traveling toward the next destination.

2. AVP Vehicle 2-1. Configuration Example

Figure 2:
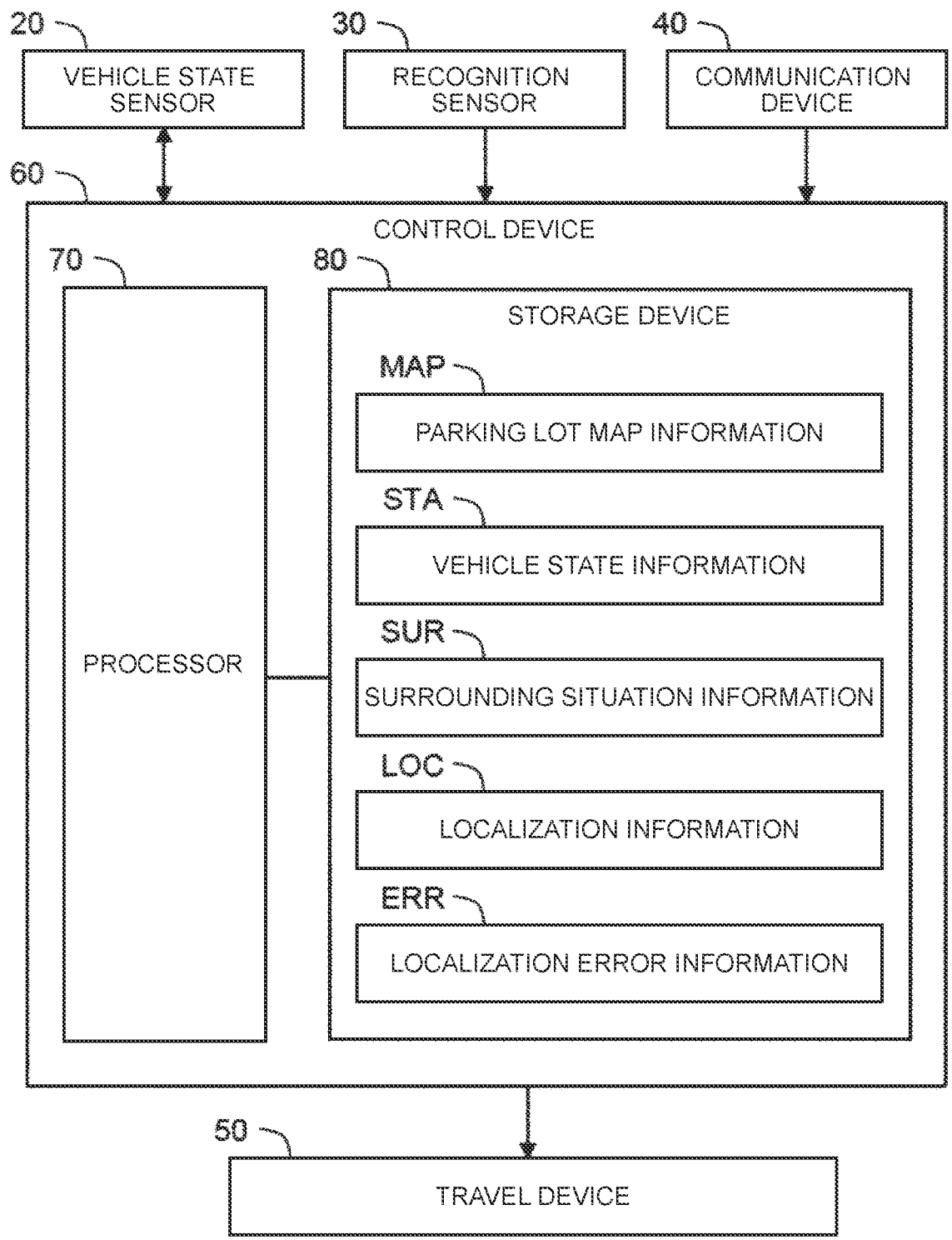
FIG. 2 is a block diagram showing a configuration example of an AVP vehicle according to the embodiment of the present disclosure.

FIG. 2 is a block diagram showing a configuration example of the AVP vehicle 10 according to the present embodiment. The AVP vehicle 10 includes a vehicle state sensor 20, a recognition sensor 30, a communication device 40, a travel device 50, and a control device 60.

The vehicle state sensor 20 detects the state of the AVP vehicle 10. Examples of the vehicle state sensor 20 include a vehicle speed sensor (vehicle wheel speed sensor), a steering angle sensor, a yaw rate sensor, a lateral acceleration sensor, and the like.

The recognition sensor 30 recognizes (detects) the situation around the AVP vehicle 10. Examples of the recognition sensor 30 include a camera, a laser imaging detection and ranging (LIDAR), a radar, and the like.

The communication device 40 communicates with the outside of the AVP vehicle 10. For example, the communication device 40 communicates with the automated valet parking system 100.

The travel device 50 includes a steering device, a driving device, and a braking device. The steering device steers the wheels of the AVP vehicle 10. For example, the steering device includes a power steering (electric power steering (EPS)) device. The driving device is a driving power source that generates a driving force. Examples of the driving device include an engine, an electric motor, an in-wheel motor, and the like. The braking device generates a braking force.

The control device 60 is a computer that controls the AVP vehicle 10. Specifically, the control device 60 includes one or more processors 70 (hereinafter, simply referred to as processor 70) and one or more storage devices 80 (hereinafter, simply referred to as storage device 80). The processor 70 executes various processes. The storage device 80 stores various kinds of information. Examples of the storage device 80 include a volatile memory, a non-volatile memory, a hard disk drive (HDD), a solid state drive (SSD), and the like. When the control device 60 (processor 70) executes a "vehicle control program" that is a computer program, various processes executed by the control device 60 are realized. The vehicle control program is stored in the storage device 80 or recorded on a computer-readable storage medium.

2-2. Information Acquisition Process

The processor 70 (control device 60) executes an information acquisition process of acquiring various kinds of information. Various kinds of information include parking lot map information MAP, vehicle state information STA, surrounding situation information SUR, and the like. The acquired information is stored in the storage device 80.

The parking lot map information MAP is the map information of the parking lot 1. Specifically, the parking lot map information MAP indicates the arrangement of the boarding-alighting area 2, the passageway 3, the parking slots 4, the landmarks 5, the stop node 6 (specified stop position), and the like in the parking lot 1. The parking lot map information MAP is provided by the automated valet parking system 100. The processor 70 acquires the parking lot map information MAP from the automated valet parking system 100 via the communication device 40.

The vehicle state information STA is information indicating the state of the AVP vehicle 10, and indicates the detection result by the vehicle state sensor 20. Examples of the state of the AVP vehicle 10 include a vehicle speed (vehicle wheel speed), a steering angle (vehicle wheel steered angle), a yaw rate, a lateral acceleration, and the like. The processor 70 acquires the vehicle state information STA from the vehicle state sensor 20.

The surrounding situation information SUR is information indicating the surrounding situation of the AVP vehicle 10, and shows the recognition result by the recognition sensor 30. For example, the surrounding situation information SUR includes image information captured by a camera. As another example, the surrounding situation information SUR includes measurement information indicating the measurement result by the LIDAR or the radar. Further, the surrounding situation information SUR includes object information regarding objects around the AVP vehicle 10. Examples of the objects around the AVP vehicle 10 include the passageway 3, the parking slots 4, the landmarks 5, white lines, and other vehicles. The object information includes relative positions and relative speeds of the objects with respect to the AVP vehicle 10 (recognition sensor 30). Based on at least one of the image information and the measurement information, objects around the AVP vehicle 10 can be recognized and the relative positions and relative speeds of the recognized objects can be calculated. In this way, the processor 70 acquires the surrounding situation information SUR based on the recognition result by the recognition sensor 30.

2-3. Localization Process

The processor 70 (control device 60) performs a "localization process (self-position estimation process, localization)" of estimating the position of the AVP vehicle 10 in the parking lot 1. The position of the AVP vehicle 10 in the parking lot 1 is hereinafter referred to as "vehicle position P". In the localization process, the vehicle state sensor 20 and the recognition sensor 30 described above are used.

Figure 3:
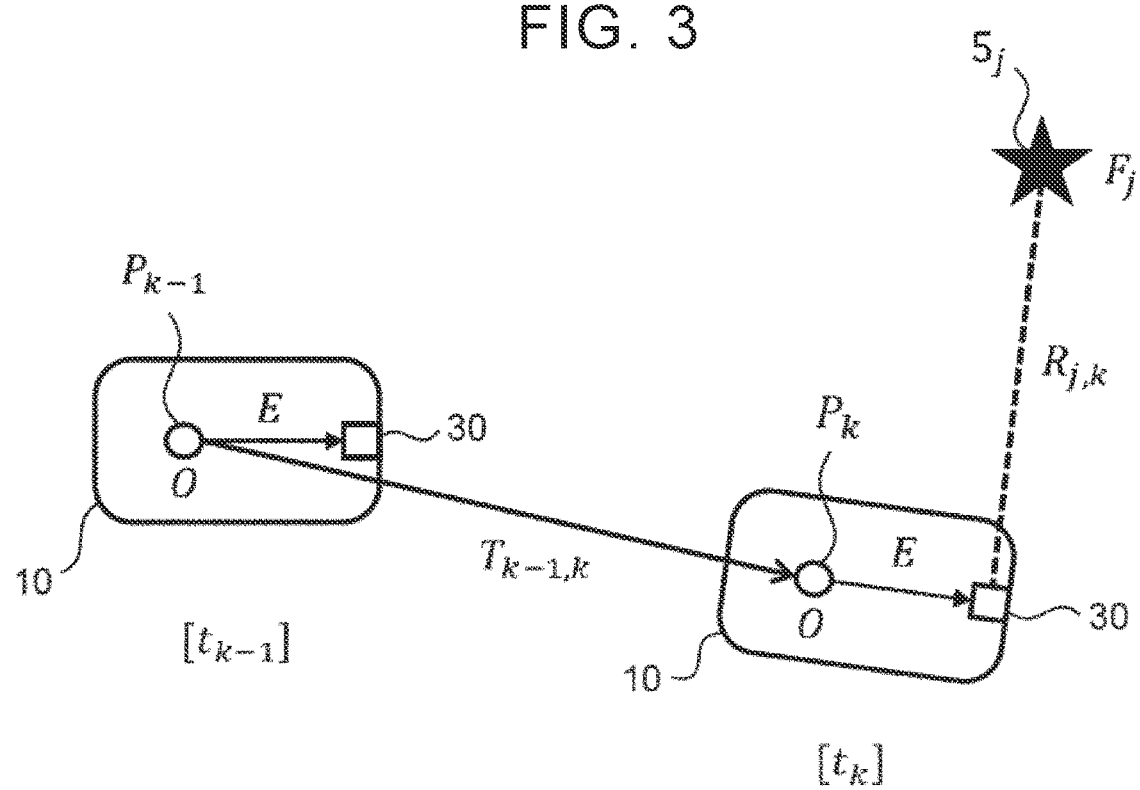
FIG. 3 is a conceptual diagram illustrating a localization process performed by the AVP vehicle according to the embodiment of the present disclosure.

FIG. 3 is a conceptual diagram illustrating the localization process. The vehicle coordinate system is a relative coordinate system that is fixed to the AVP vehicle 10 and changes with the movement of the AVP vehicle 10. The position of an origin O in the vehicle coordinate system in the AVP vehicle 10 is appropriately set. It can be said that the vehicle position P is the position of the origin O in the parking lot 1. A calibration parameter E indicates the installation position and the installation orientation of the recognition sensor 30 in the vehicle coordinate system. That is, the calibration parameter E represents a translational rotational movement amount of the recognition sensor 30 with respect to the origin O.

The localization process estimates the vehicle position P at regular cycles. For convenience, time $t_k$ and the vehicle position $P_k$ to be estimated are referred to as "target time $t_k$" and "target vehicle position $P_k$", respectively. In order to estimate the target vehicle position $P_k$ at the target time $t_k$, the vehicle position $P_{k-1}$ at the previous time $t_{k-1}$ is used. For convenience, the previous time $t_{k-1}$ and the vehicle position $P_{k-1}$ are referred to as "reference time $t_{k-1}$" and "reference vehicle position $P_{k-1}$", respectively.

The vehicle movement amount $T_{k-1,k}$ is the movement amount of the AVP vehicle 10 between the reference time $t_{k-1}$ and the target time $t_k$. The vehicle movement amount $T_{k-1,k}$ can be calculated based on the vehicle state information STA obtained by the vehicle state sensor 20. For example, the vehicle movement amount $T_{k-1,k}$ can be calculated based on the history of the vehicle wheel speed and the steering angle detected in the period between the reference time $t_{k-1}$ and the target time $t_k$.

Further, by using the recognition sensor 30, it is possible to recognize one or more landmarks $5_j$ around the AVP vehicle 10. The absolute position $F_j$ of the landmark $5_j$ in the parking lot 1 is known and can be obtained from the parking lot map information MAP. On the other hand, the relative position $R_{j,k}$ of the landmark $5_j$ with respect to the recognition sensor 30 at the time $t_k$ is obtained from the surrounding situation information SUR.

Figure 4:
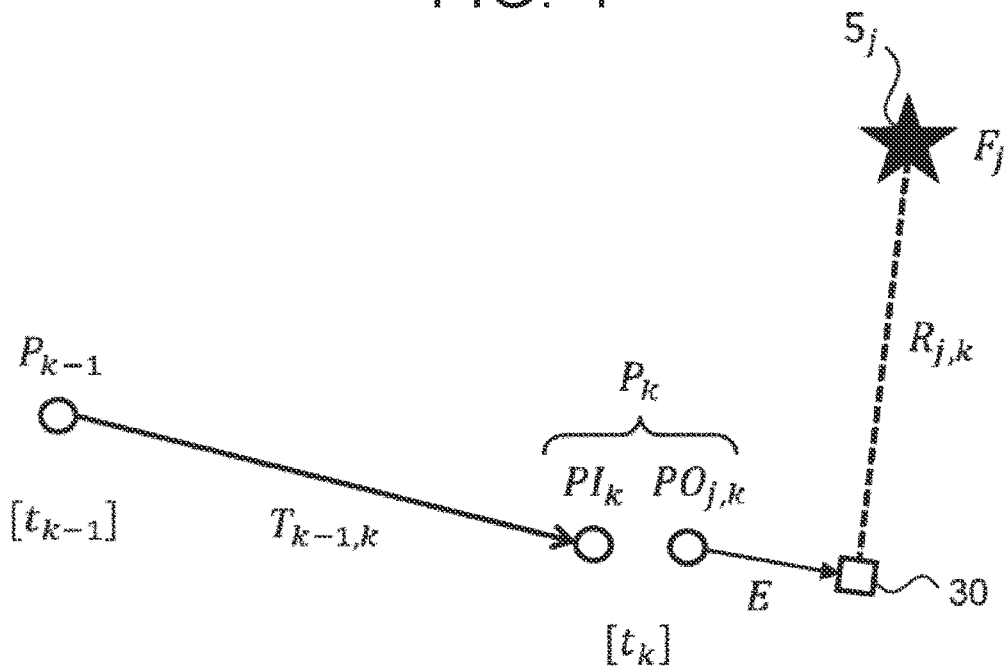
FIG. 4 is a conceptual diagram illustrating the localization process performed by the AVP vehicle according to the embodiment of the present disclosure.

FIG. 4 is a conceptual diagram illustrating an "internally estimated vehicle position $PI_k$" and an "externally estimated vehicle position $PO_{j,k}$" at the target time $t_k$. The internally estimated vehicle position $PI_k$ is the target vehicle position $P_k$ calculated (estimated) from the reference vehicle position $P_{k-1}$ at the reference time $t_{k-1}$ and the vehicle movement amount $T_{k-1,k}$. On the other hand, the externally estimated vehicle position $PO_{j,k}$ is the target vehicle position $P_k$ calculated (estimated) from the absolute position $F_j$ of the landmark $5_j$, the relative position $R_{j,k}$ of the landmark $5_j$ with respect to the recognition sensor 30, and the calibration parameter E.

The internally estimated vehicle position $PI_k$ and the externally estimated vehicle position $PO_{j,k}$ with respect to one or more landmarks $5_j$ do not always match. Therefore, the target vehicle position $P_k$ at the target time $t_k$ is determined by combining the internally estimated vehicle position $PI_k$ and the externally estimated vehicle position $PO_{j,k}$ with respect to one or more landmarks $5_j$. For example, the target vehicle position $P_k$ is determined by correcting the internally estimated vehicle position $PI_k$ such that the internally estimated vehicle position $PI_k$ matches the externally estimated vehicle position $PO_{j,k}$ with respect to one or more landmarks $5_j$ the best. In other words, the target vehicle position $P_k$ is optimized by using the evaluation function based on the internally estimated vehicle position $PI_k$ and the externally estimated vehicle position $PO_{j,k}$. The evaluation function and the optimization method are well known, and are not particularly limited in the present embodiment.

The estimated target vehicle position $P_k$ is used as a reference vehicle position at the next time $t_{k+1}$. With the repetition of the above processes, the vehicle position P of the AVP vehicle 10 is continuously estimated.

Localization information LOC indicates the vehicle position P estimated by the localization process. As described above, the processor 70 executes the localization process based on the parking lot map information MAP, the vehicle state information STA, and the surrounding situation information SUR, and acquires the localization information LOC. The localization information LOC is stored in the storage device 80.

Figure 5:
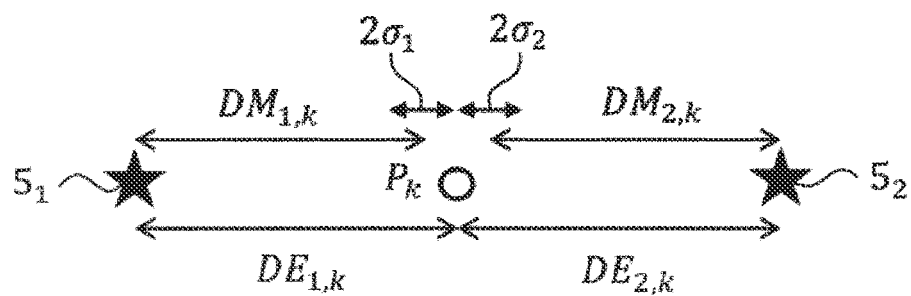
FIG. 5 is a conceptual diagram illustrating a localization error.

FIG. 5 is a conceptual diagram illustrating a localization error. As the distance between the AVP vehicle 10 and the landmark $5_j$ at the time $t_k$, two types of distance including an estimated distance $DE_{j,k}$ and a measured distance $DM_{j,k}$ will be considered. The estimated distance $DE_{j,k}$ is a distance between the vehicle position $P_k$ estimated through the localization process and the absolute position $F_j$ of the landmark $5_j$. The measured distance $DM_{j,k}$ is a distance obtained from the recognition result by the recognition sensor 30, and is calculated from the relative position $R_{j,k}$ of the landmark $5_j$ and the calibration parameter E. For the measured distance $DM_{j,k}$, a measurement error $\sigma_j$ depending on the types of the recognition sensor 30 and the landmark $5_j$ is conceivable. As the measurement error $\sigma_j$, a constant value that does not depend on the landmark $5_j$ may be set. In FIG. 5, as an example, the estimated distance $DE_{j,k}$ and the measured distance $DM_{j,k}$ for each of the two landmarks $5_1$, $5_2$ (j=1, 2) are shown. The localization error $\varepsilon_k$ represents the estimation error of the vehicle position $P_k$ estimated through the localization process. This localization error $\varepsilon_k$ is expressed by, for example, the following equation (1).

$$\varepsilon_k = \sqrt{\frac{\sum_j \frac{(DM_{j,k} - DE_{j,k})^2}{\sigma_j^2}}{\sum_j \frac{1}{\sigma_j^2}}} \qquad (1)$$

The processor 70 continuously performs the localization process and accumulates the localization errors $\varepsilon_k$. Localization error information ERR indicates the distribution of the accumulated localization errors $\varepsilon_k$. The localization error information ERR is stored in the storage device 80. The processor 70 updates the localization error information ERR while performing the localization process.

2-4. Communication Process

The processor 70 (control device 60) communicates with the automated valet parking system 100 via the communication device 40. For example, the processor 70 receives the parking lot map information MAP, entrance guidance information, exit guidance information, and the like from the automated valet parking system 100. Further, the processor 70 may periodically transmit the vehicle state information STA and the localization information LOC to the automated valet parking system 100. The processor 70 may transmit the localization error information ERR to the automated valet parking system 100.

2-5. Vehicle Travel Control

The processor 70 (control device 60) executes the "vehicle travel control" for controlling the traveling of the AVP vehicle 10 without the driving operation of the driver. The vehicle travel control includes steering control, acceleration control, and braking control. The processor 70 executes the vehicle travel control by controlling the travel device 50. Specifically, the processor 70 executes the steering control by controlling the steering device. The processor 70 also executes the acceleration control by controlling the driving device. The processor 70 also executes the braking control by controlling the braking device.

In the parking lot 1, the processor 70 executes the vehicle travel control in order to cause the AVP vehicle 10 to travel autonomously. Specifically, the processor 70 grasps the map of the parking lot 1 and the vehicle position P in the parking lot 1 based on the parking lot map information MAP and the localization information LOC. Then, the processor 70 executes the vehicle travel control such that the AVP vehicle 10 autonomously travels toward the destination.

For example, in the case of the above-described entrance process, the departure place is the boarding-alighting area 2, and the destination is the allocated parking slot 4. The processor 70 executes the vehicle travel control such that the AVP vehicle 10 autonomously travels from the boarding-alighting area 2 to the allocated parking slot 4 and autonomously parks in the allocated parking slot 4. The position of the allocated parking slot 4 is obtained from the parking lot map information MAP. The processor 70 may execute the vehicle travel control such that the AVP vehicle 10 travels along the travel route specified by the automated valet parking system 100. When the AVP vehicle 10 is parked in the parking slot 4, the parking slot 4 and the parking situation of the surrounding area can be grasped by referring to the surrounding situation information SUR. The vehicle travel control may be executed so as to suppress a collision with another vehicle or a structure by referring to the surrounding situation information SUR.

The same applies to the exit process. In the case of the exit process, the departure place is the allocated parking slot 4 and the destination is the boarding-alighting area 2. The processor 70 executes the vehicle travel control such that the AVP vehicle 10 autonomously travels from the parking slot 4 to the boarding-alighting area 2 and autonomously stops in the boarding-alighting area 2.

3. Vehicle Stop Process

Figure 6:
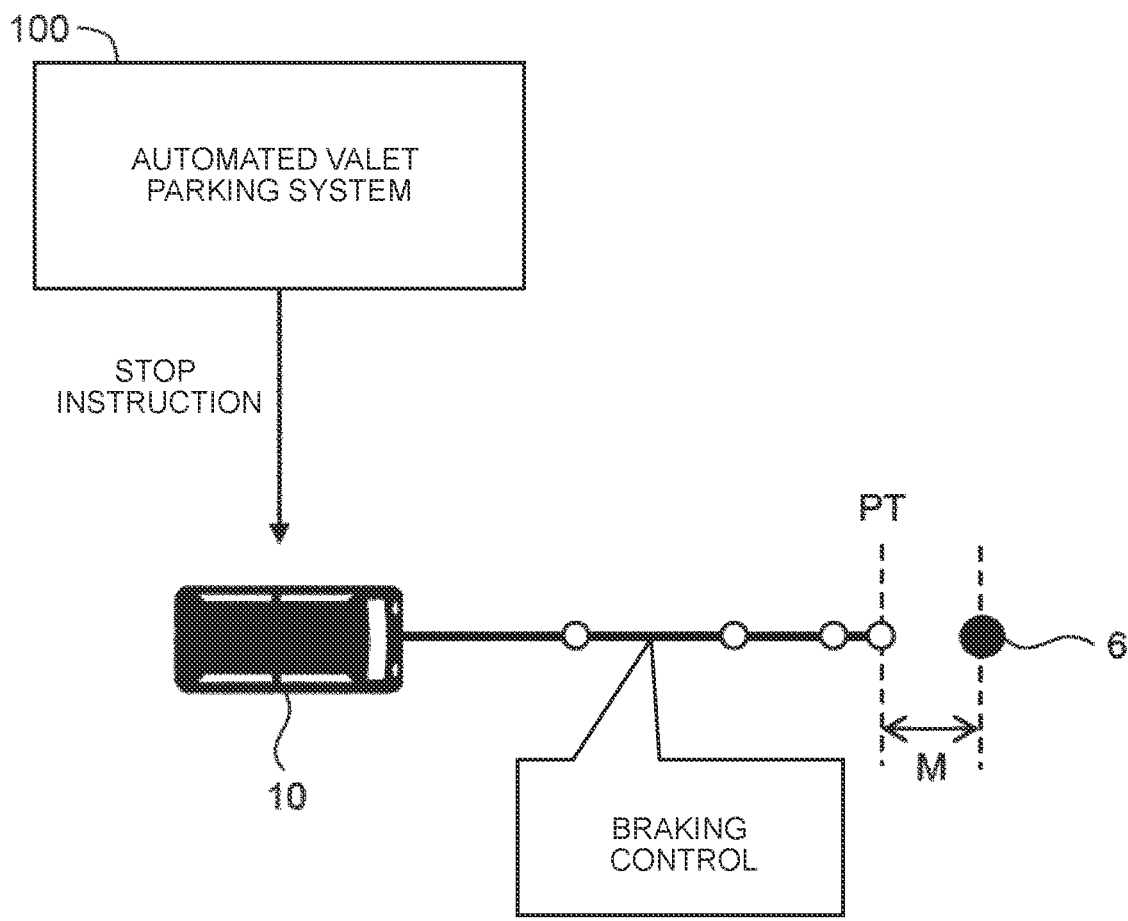
FIG. 6 is a conceptual diagram illustrating an overview of a vehicle stop process according to the embodiment of the present disclosure.

FIG. 6 is a conceptual diagram illustrating an overview of a "vehicle stop process" according to the present embodiment. When it is necessary to stop the AVP vehicle 10 during autonomous traveling in the parking lot 1, the vehicle stop process is executed. Specifically, the automated valet parking system 100 specifies the stop node 6 and instructs the AVP vehicle 10 to stop before the specified stop node 6 (specified stop position).

The processor 70 of the AVP vehicle 10 receives a stop instruction from the automated valet parking system 100 via the communication device 40. In response to the stop instruction, the processor 70 performs the vehicle travel control (braking control) such that the AVP vehicle 10 stops before the specified stop node 6. The position of the stop node 6 in the parking lot 1 is obtained from the parking lot map information MAP. The processor 70 performs the braking control based on the vehicle position P estimated through the localization process.

More specifically, the processor 70 performs the braking control such that the AVP vehicle 10 stops a "margin distance M" before the specified stop node 6. For this, the processor 70 sets the position the margin distance M before the stop node 6 as a target stop position PT. Then, the processor 70 performs the braking control such that the AVP vehicle 10 stops at the target stop position PT based on the vehicle position P estimated through the localization process. The target deceleration in the braking control may be determined in advance.

Here, the possibility that the accuracy of the localization process decreases is considered. For example, when an abnormality occurs in at least one of the vehicle state sensor 20 and the recognition sensor 30, the accuracy of the localization process decreases. As another example, the recognition accuracy of the landmarks 5 decreases depending on the time range or weather, which causes decrease in accuracy of the localization process. When the accuracy of the localization process decreases, the accuracy of the vehicle position P used in the vehicle travel control also decreases. When the accuracy of the vehicle position P decreases, the actual stop position at which the AVP vehicle 10 actually stops deviates from the target stop position PT.

A case is considered where a default value α that is set regardless of the accuracy of the localization process is used as the margin distance M above. The default value α may be a fixed value or a variable value. When the default value α is used, in a situation where the accuracy of the localization process is low, the AVP vehicle 10 may not stop before the stop node 6 and may exceed the stop node 6. In some embodiments, this means decrease in reliability of the vehicle stop process, which is not desirable.

In order to more reliably stop the AVP vehicle 10 before the stop node 6, in some embodiments, the margin distance M is set in consideration of the possibility that a decrease in accuracy of the localization process occurs. The margin distance M set in consideration of the possibility of decrease in accuracy of the localization process is hereinafter referred to as "first margin distance M1".

The first margin distance M1 is represented by the sum of the default value α and a correction value β, that is, "α+β". In other words, the first margin distance M1 is longer than the default value α by the correction value β. The default value α is a value of zero or more. The correction value β is a parameter that reflects the variance σL of the distribution of the localization errors $\varepsilon_k$ described above. For example, the correction value β is the variance σL itself of the distribution of the localization errors $\varepsilon_k$. As another example, the correction value β may be a real multiple of the variance σL. The variance σL of the distribution of the localization errors $\varepsilon_k$ is obtained from the localization error information ERR. By performing the vehicle stop process using the first margin distance M1, it is possible to suppress the AVP vehicle 10 from exceeding the stop node 6 even if the accuracy of the localization process decreases. That is, it is possible to more reliably stop the AVP vehicle 10 before the stop node 6.

As a comparison, the margin distance M that is set without consideration of the possibility of decrease in accuracy of the localization process is hereinafter referred to as "second margin distance M2". The second margin distance M2 is the default value α.

It is also possible to select (selectively use) the first margin distance M1 and the second margin distance M2 depending on the situation. For example, when the illuminance of the environment around the AVP vehicle 10 is low, the recognition accuracy of the landmarks 5 may decrease and the accuracy of the localization process may also decrease. Therefore, when the illuminance is less than a predetermined value, the first margin distance M1 may be selected.

As another example, a scene is considered in which a collision with a pedestrian or another vehicle may occur if the AVP vehicle 10 does not stop and exceeds the stop node 6. Such a stop node 6 is referred to as "first stop node 6-1". In the case of the first stop node 6-1, it is particularly desired to stop the AVP vehicle 10 before the first stop node 6-1. Thus, in some embodiments, the first margin distance M1 is selected as the margin distance M with respect to the first stop node 6-1.

Figure 7:
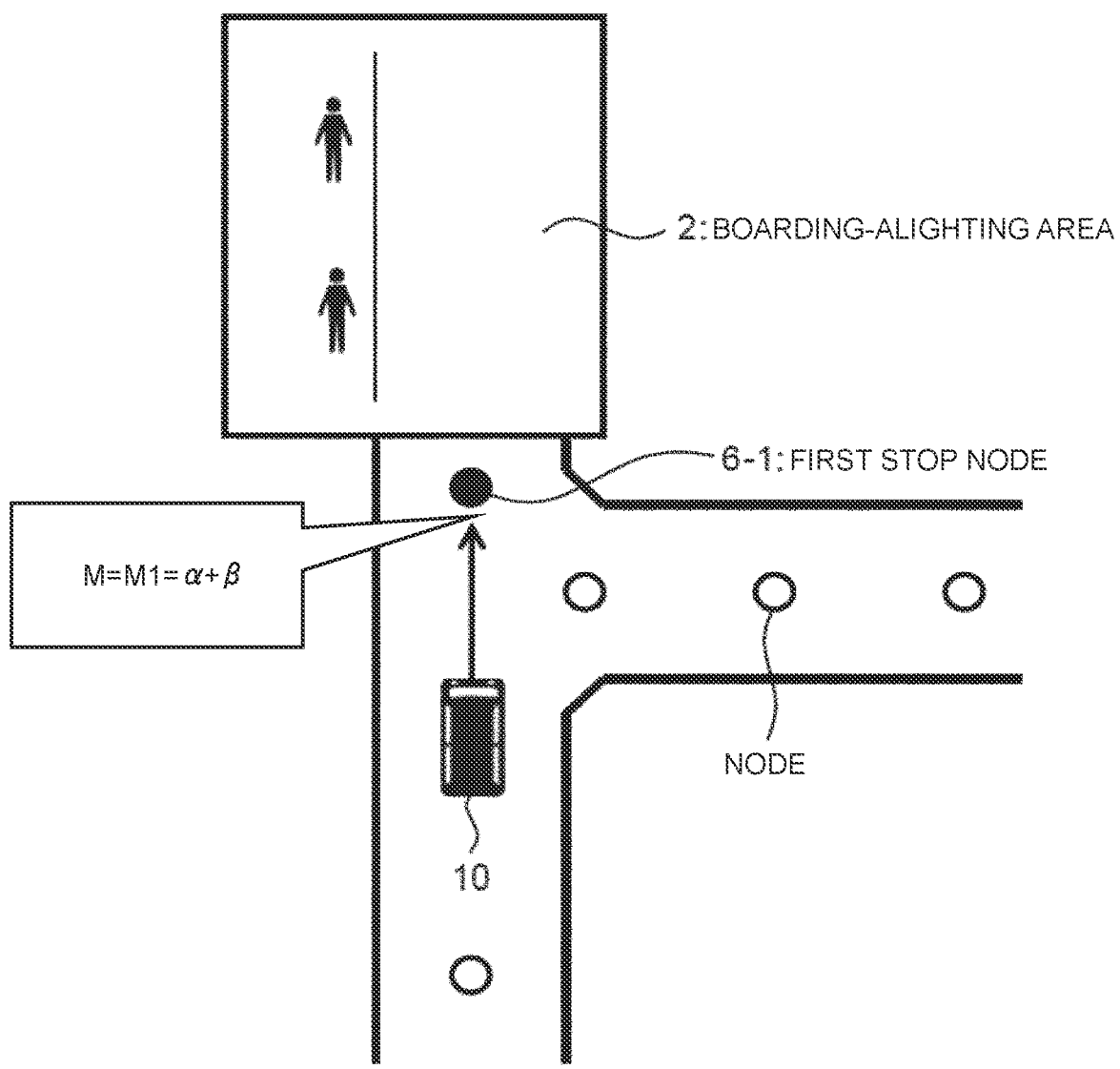
FIG. 7 is a conceptual diagram illustrating an example of setting a margin distance in the vehicle stop process according to the embodiment of the present disclosure.

FIG. 7 is a conceptual diagram illustrating an example of the first stop node 6-1. The first stop node 6-1 shown in FIG. 7 is a stop node 6 before the boarding-alighting area 2. In other words, the first stop node 6-1 is a stop node adjacent to the boarding-alighting area 2. In the boarding-alighting area 2, the user gets off the AVP vehicle 10 or the user gets into the AVP vehicle 10. In order to suppress a collision with the user, in some embodiments, the margin distance M is set to the first margin distance M1.

Figure 8:
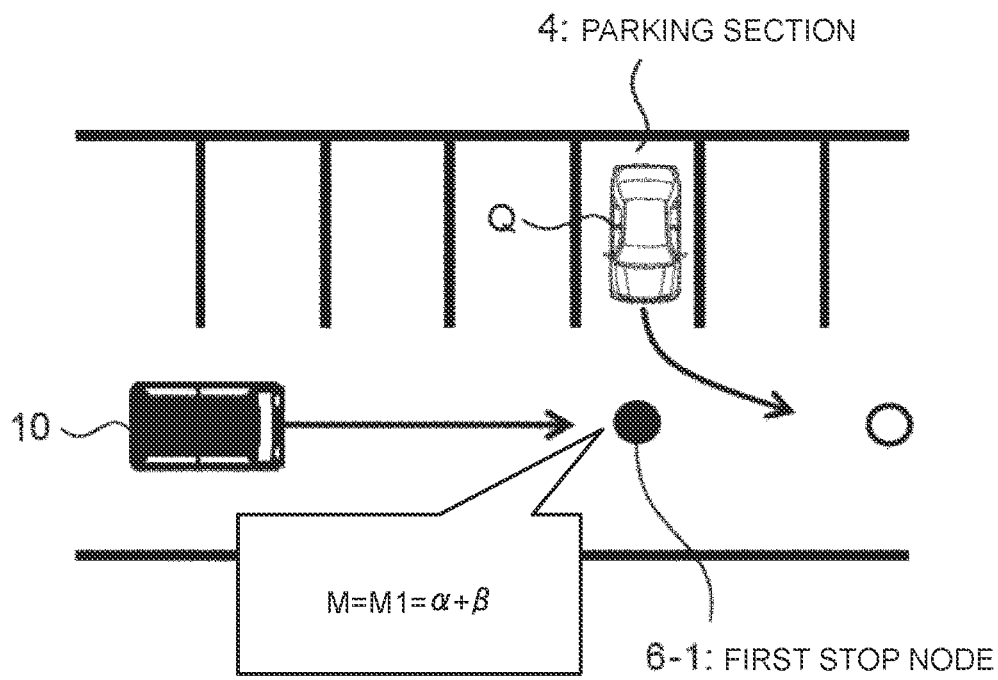
FIG. 8 is a conceptual diagram illustrating another example of setting the margin distance in the vehicle stop process according to the embodiment of the present disclosure.

FIG. 8 is a conceptual diagram illustrating another example of the first stop node 6-1. The first stop node 6-1 shown in FIG. 8 is a stop node 6 in front of the parking slot 4. For example, the first stop node 6-1 is a stop node 6 in front of the parking slot 4 that is allocated to another vehicle Q that is exiting or is scheduled to exit in the near future. In order to suppress a collision with the other vehicle Q, in some embodiments, the margin distance M is set to the first margin distance M1.

Figure 9:
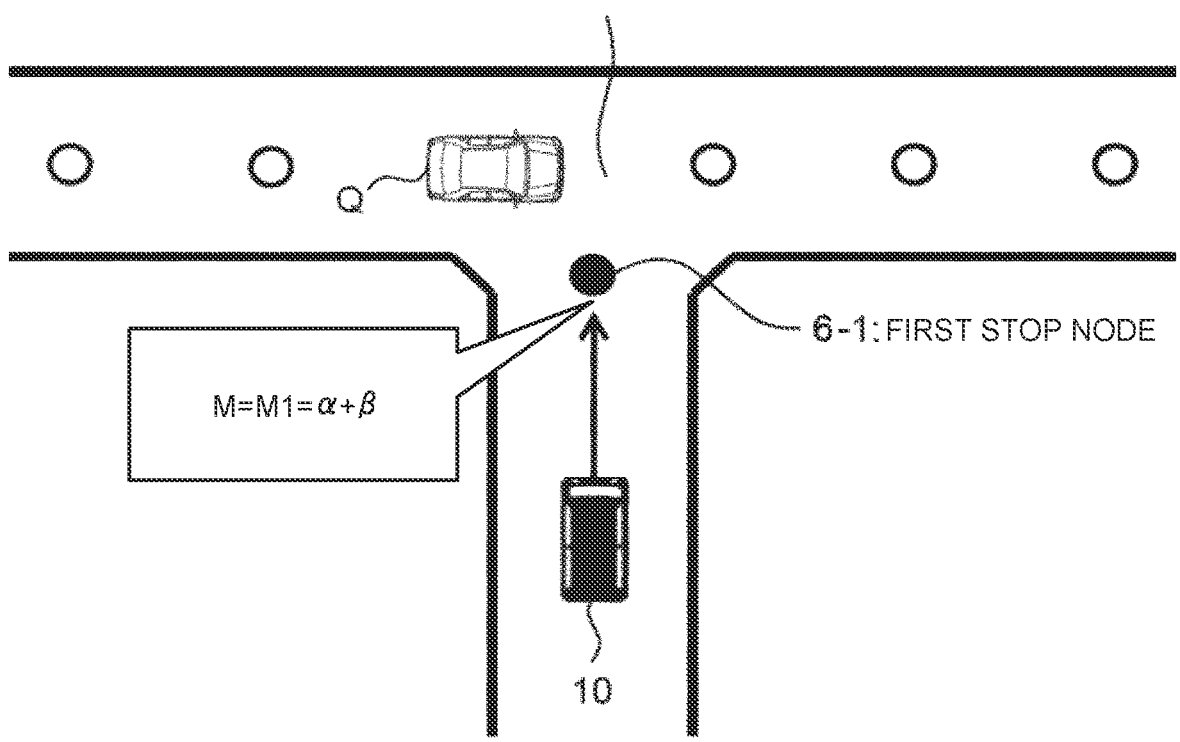
FIG. 9 is a conceptual diagram illustrating yet another example of setting the margin distance in the vehicle stop process according to the embodiment of the present disclosure.

FIG. 9 is a conceptual diagram illustrating yet another example of the first stop node 6-1. The first stop node 6-1 shown in FIG. 9 is a stop node 6 before an intersection 7. In other words, the first stop node 6-1 is a stop node adjacent to the intersection 7. There is a possibility that there is the other vehicle Q at the intersection 7. In order to suppress a collision with the other vehicle Q, in some embodiments, the margin distance M is set to the first margin distance M1.

Figure 10:
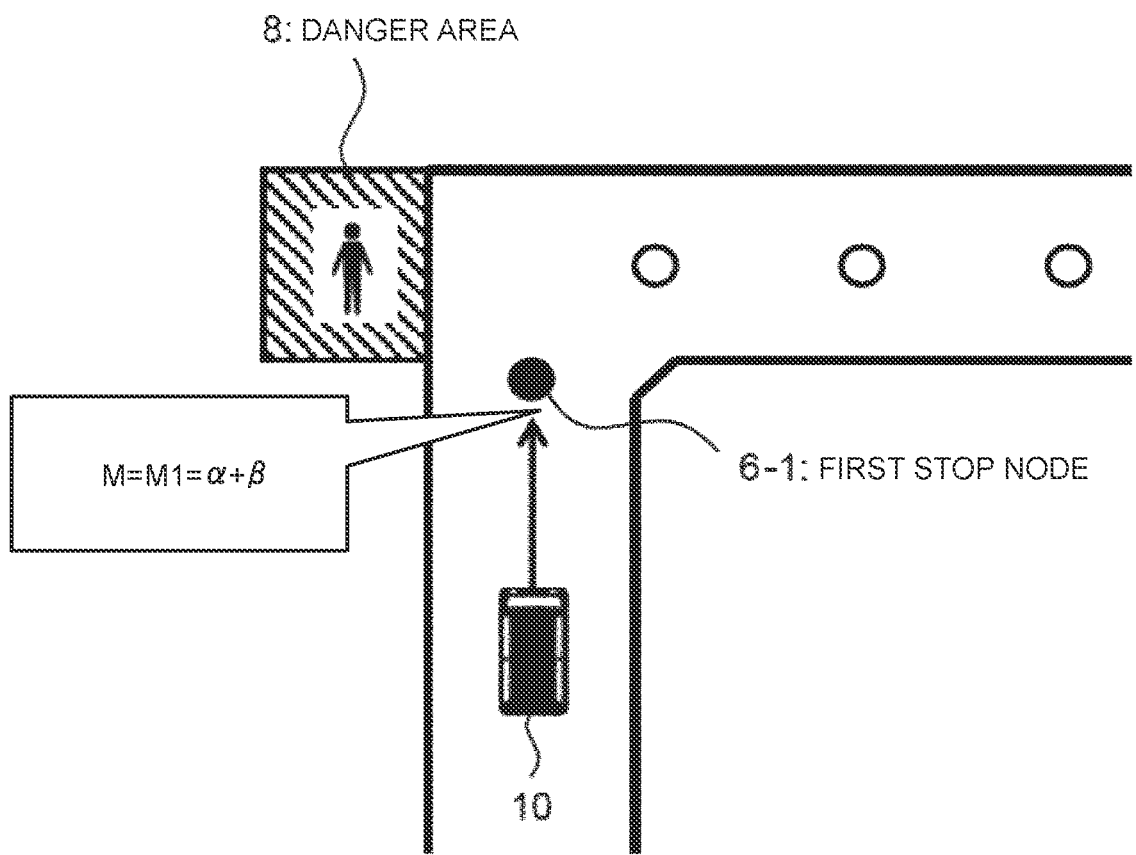
FIG. 10 is a conceptual diagram illustrating yet another example of setting the margin distance in the vehicle stop process according to the embodiment of the present disclosure.

FIG. 10 is a conceptual diagram illustrating yet another example of the first stop node 6-1. The first stop node 6-1 shown in FIG. 10 is a stop node 6 adjacent to a danger area 8. The danger area 8 is an area where there are humans such as pedestrians and workers. In order to suppress a collision with a human, in some embodiments, the margin distance M is set to the first margin distance M1.

As described above, in the vehicle stop process according to the present embodiment, the vehicle travel control is performed such that the AVP vehicle 10 stops the margin distance M before the stop node 6. The vehicle travel control is performed based on the vehicle position P estimated through the localization process. The first margin distance M1 is represented by the sum (α+β) of the default value α and the correction value β. The correction value β is a parameter that reflects the variance σL of the distribution of the estimation errors (localization errors $\varepsilon_k$) of the vehicle position P estimated through the localization process. By using the first margin distance M1 as the margin distance M, it is possible to suppress the AVP vehicle 10 from exceeding the stop node 6 even if the accuracy of the localization process decreases. That is, it is possible to more reliably stop the AVP vehicle 10 before the stop node 6.

4. Configuration Example of Automated Valet Parking System

Figure 11:
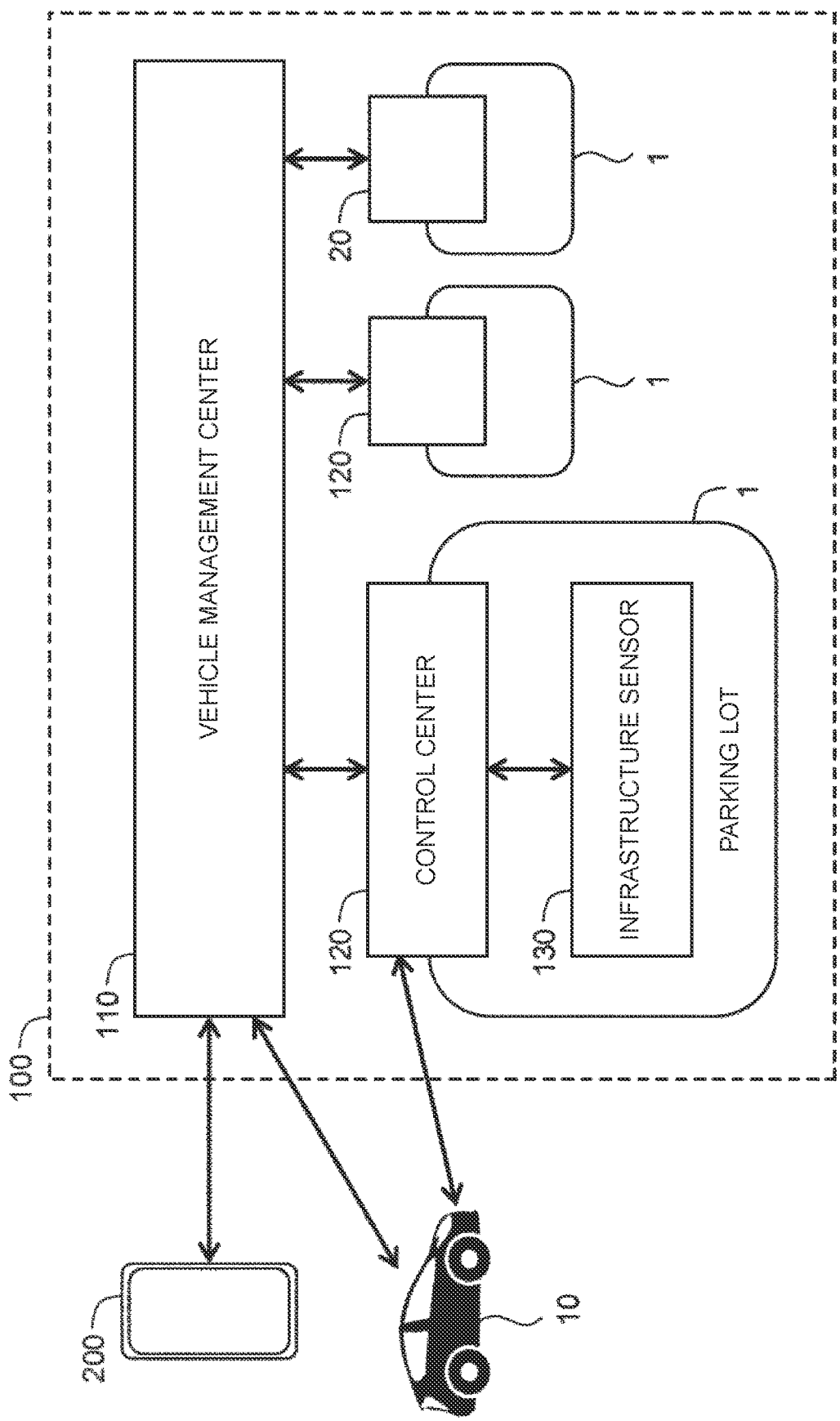
FIG. 11 is a schematic diagram showing a configuration example of the automated valet parking system according to the embodiment of the present disclosure.

FIG. 11 is a schematic diagram showing a configuration example of the automated valet parking system 100 according to the present embodiment. The automated valet parking system 100 includes a vehicle management center 110, a control center 120, and an infrastructure sensor 130. The control center 120 is provided for each parking lot 1. Therefore, there are the same number of control centers 120 as the parking lots 1. The vehicle management center 110 controls all the control centers 120. The infrastructure sensor 130 is installed in the parking lot 1 and recognizes the situation in the parking lot 1. For example, the infrastructure sensor 130 includes an infrastructure camera that captures an image of a situation in the parking lot 1.

Figure 12:
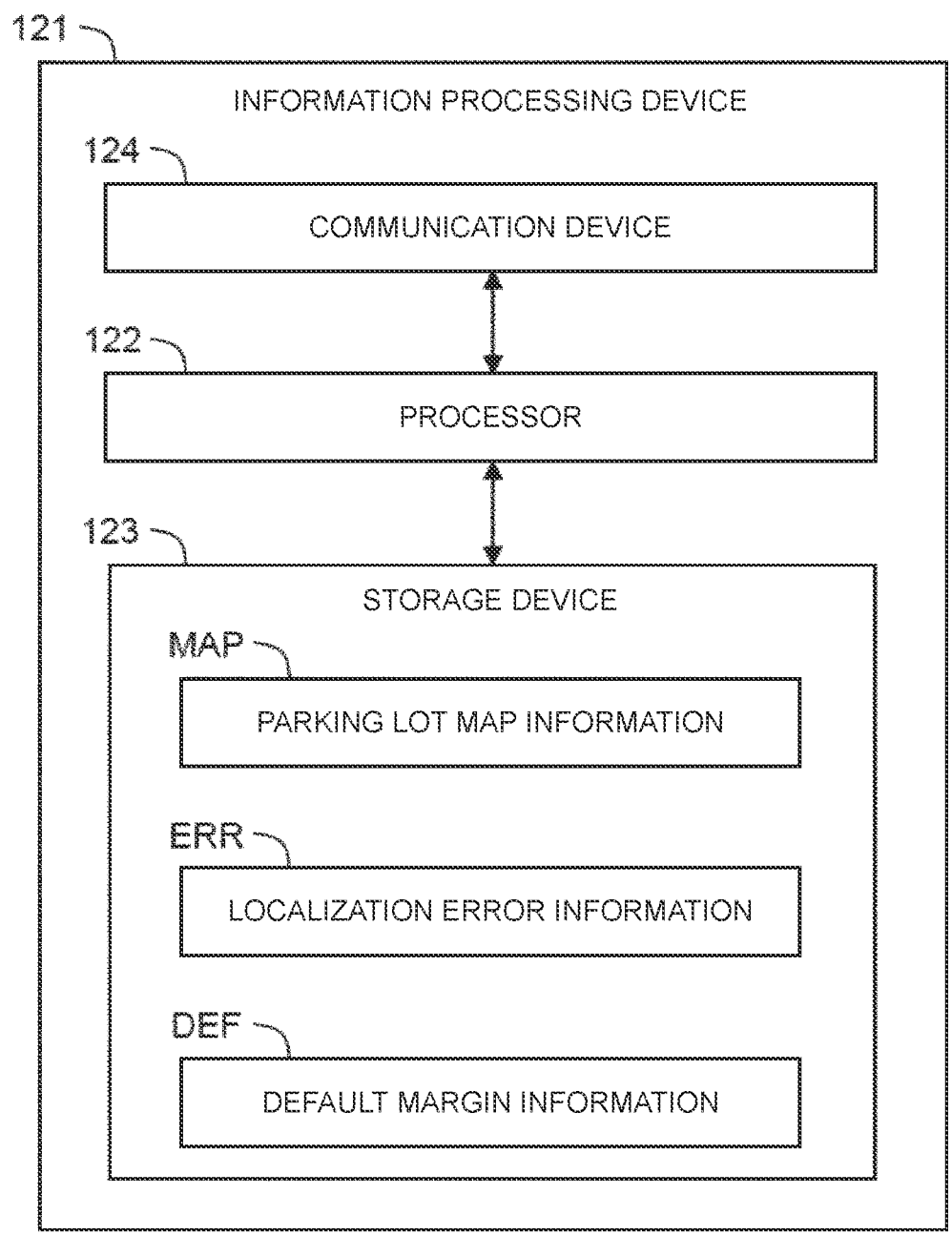
FIG. 12 is a block diagram showing a configuration example of a control center according to the embodiment of the present disclosure.

FIG. 12 is a block diagram showing a configuration example of the control center 120 according to the present embodiment. The control center 120 includes an information processing device 121 (controller). The information processing device 121 manages the AVP vehicle 10 in the parking lot 1 and also controls the AVP vehicle 10 in the parking lot 1.

The information processing device 121 includes one or more processors 122 (hereinafter, simply referred to as processor 122) and one or more storage devices 123 (hereinafter, simply referred to as storage device 123). The processor 122 executes various processes. The storage device 123 stores various kinds of information. Examples of the storage device 123 include a volatile memory, a non-volatile memory, a hard disk drive (HDD), a solid state drive (SSD), and the like. When the information processing device 121 (processor 122) executes a control program that is a computer program, various processes executed by the information processing device 121 are realized. The control program is stored in the storage device 123 or recorded on a computer-readable storage medium.

The information processing device 121 further includes a communication device 124. The communication device 124 communicates with the vehicle management center 110, the AVP vehicle 10, and the infrastructure sensor 130 via the communication network.

The parking lot map information MAP is created in advance and stored in the storage device 123 of the control center 120. The processor 122 communicates with the AVP vehicle 10 via the communication device 124, and provides the parking lot map information MAP to the AVP vehicle 10.

The localization error information ERR indicates the distribution of the localization errors $\varepsilon_k$. For example, the processor 122 receives the localization error information ERR from the AVP vehicle 10 via the communication device 124. As another example, the processor 122 may receive the localization information LOC and the surrounding situation information SUR from the AVP vehicle 10 via the communication device 124. In that case, the processor 122 calculates and accumulates the localization errors $\varepsilon_k$ based on the received localization information LOC and surrounding situation information SUR, and generates and updates the localization error information ERR. The localization error information ERR is stored in the storage device 123.

Default margin information DEF indicates the default value α of the margin distance M. The default margin information DEF is created in advance and stored in the storage device 123. The processor 122 may transmit the default margin information DEF to the AVP vehicle 10 via the communication device 124. In that case, the default margin information DEF is also stored in the storage device 80 of the AVP vehicle 10.

5. Process Flow of Vehicle Stop Process

Figure 13:
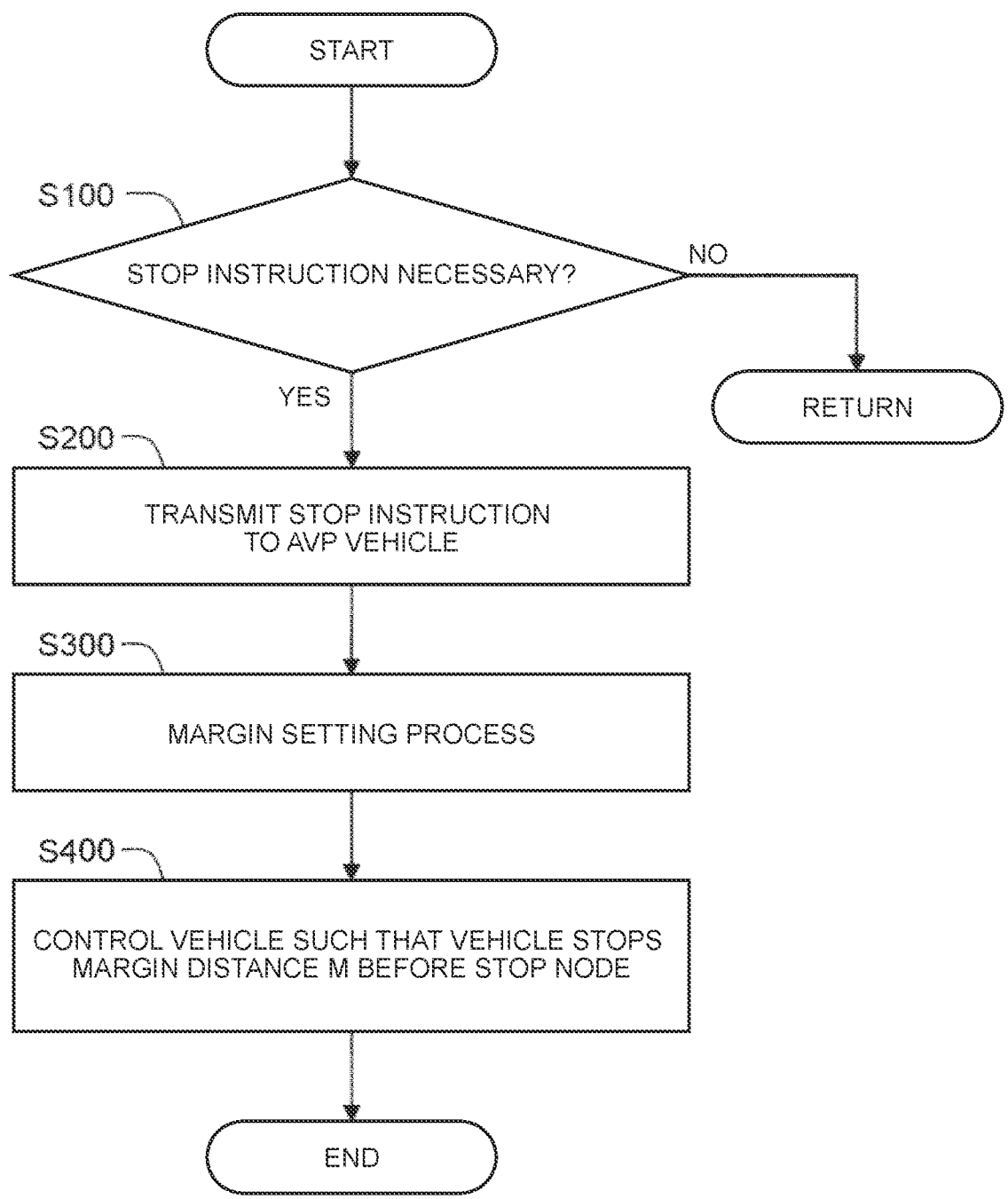
FIG. 13 is a flowchart showing the vehicle stop process according to the embodiment of the present disclosure.

FIG. 13 is a flowchart showing the vehicle stop process according to the present embodiment.

In step S100, the processor 122 of the control center 120 determines whether the stop instruction is necessary for the AVP vehicle 10 traveling in the parking lot 1. For example, the processor 122 receives the localization information LOC from the AVP vehicle 10 via the communication device 124. Then, the processor 122 determines whether the AVP vehicle 10 has entered a range of a certain distance from the stop node 6 on the travel route, based on the localization information LOC and the parking lot map information MAP. When the AVP vehicle 10 has entered the range of a certain distance from the stop node 6 on the travel route, the processor 122 determines that the stop instruction to the AVP vehicle 10 is necessary. When the stop instruction is necessary (step S100; Yes), the process proceeds to step S200.

In step S200, the processor 122 transmits the stop instruction to the AVP vehicle 10 via the communication device 124. The stop instruction specifies at least the stop node 6 and instructs the AVP vehicle 10 to stop before the specified stop node 6 (specified stop position).

In step S300, a "margin setting process" of setting the margin distance M is performed. Various examples of the margin setting process will be described later. The margin setting process may be performed by the processor 70 of the AVP vehicle 10 or may be performed by the processor 122 of the control center 120. When the margin setting process is performed by the processor 122 of the control center 120, the margin setting process may be performed prior to step S200. In that case, the stop instruction may also include the margin distance M set by the processor 122.

In step S400, the processor 70 of the AVP vehicle 10 performs the vehicle travel control (braking control) such that the AVP vehicle 10 stops before the specified stop node 6. More specifically, the processor 70 performs the braking control such that the AVP vehicle 10 stops the margin distance M before the stop node 6. For this, the processor 70 sets the position the margin distance M before the stop node 6 as the target stop position PT (see FIG. 6). The position of the stop node 6 in the parking lot 1 is obtained from the parking lot map information MAP. The margin distance M is set in step S300 described above. The processor 70 performs the braking control such that the AVP vehicle 10 stops at the target stop position PT based on the vehicle position P estimated through the localization process. The target deceleration in the braking control may be determined in advance.

Hereinafter, various examples of the margin setting process (step S300) will be described.

5-1. First Example

Figure 14:
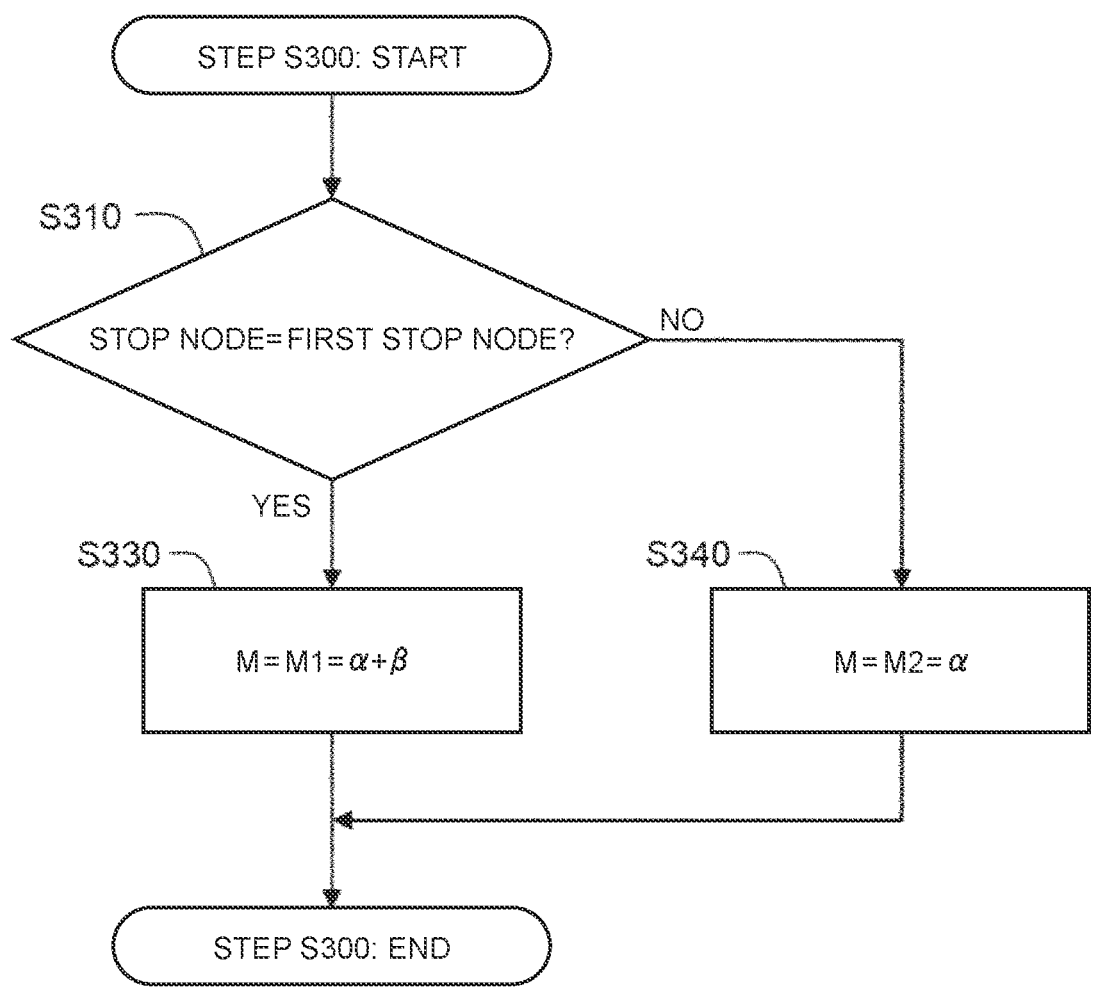
FIG. 14 is a flowchart showing a first example of a margin setting process (step S300) according to the embodiment of the present disclosure.

FIG. 14 is a flowchart showing a first example of the margin setting process (step S300). In the first example, the margin setting process includes a "selection process" of selecting either the first margin distance M1 or the second margin distance M2 as the margin distance M.

More specifically, in step S310, the processor 70 of the AVP vehicle 10 or the processor 122 of the control center 120 (hereinafter, simply referred to as "processor") determines whether the stop node 6 is the first stop node 6-1. The first stop node 6-1 is the stop node 6 related to a scene in which a collision with a pedestrian or another vehicle may occur if the AVP vehicle 10 does not stop and exceeds the stop node 6. For example, the first stop node 6-1 includes at least one of those illustrated in FIGS. 7 to 10. The processor can determine whether the stop node 6 is the first stop node 6-1 based on the parking lot map information MAP.

When the specified stop node 6 is the first stop node 6-1 (step S310; Yes), the process proceeds to step S330. In step S330, the processor selects the first margin distance M1 and sets the first margin distance M1 as the margin distance M. The first margin distance M1 is the sum (β+β) of the default value α and the correction value β. In other words, the first margin distance M1 is longer than the default value α by the correction value β. The default value α is obtained from the default margin information DEF. The correction value β is a parameter that reflects the variance σL of the distribution of the localization errors $\varepsilon_k$. For example, the correction value β is the variance σL itself of the distribution of the localization errors $\varepsilon_k$. As another example, the correction value β may be a real multiple of the variance GL. The variance σL of the distribution of the localization errors $\varepsilon_k$ is obtained from the localization error information ERR.

When the specified stop node 6 is not the first stop node 6-1 (step S310; No), the process proceeds to step S340. In step S340, the processor selects the second margin distance M2 and sets the second margin distance M2 as the margin distance M. The second margin distance M2 is the default value α.

The process of step S330 is hereinafter referred to as "first margin setting process". The process of step S340 is hereinafter referred to as "second margin setting process". When the specified stop node 6 is the first stop node 6-1 (step S310; Yes), the processor selects the first margin setting process and sets the margin distance M. When the specified stop node 6 is not the first stop node 6-1 (step S310; No), the processor selects the second margin setting process and sets the margin distance M.

5-2. Second Example

Figure 15:
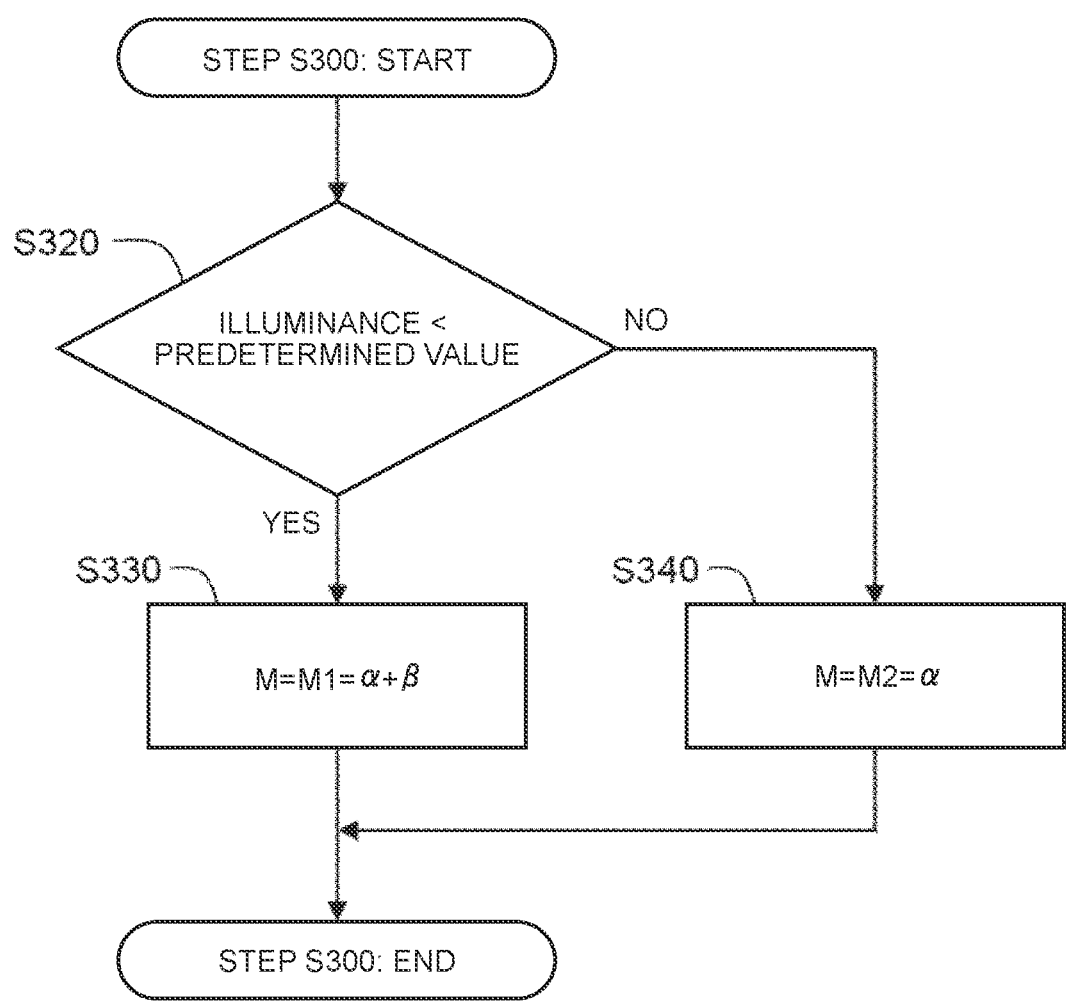
FIG. 15 is a flowchart showing a second example of the margin setting process (step S300) according to the embodiment of the present disclosure.

FIG. 15 is a flowchart showing a second example of the margin setting process (step S300). Also in the second example, the margin setting process includes the "selection process" of selecting either the first margin distance M1 or the second margin distance M2 as the margin distance M.

More specifically, in step S320, the processor determines whether the illuminance of the environment around the AVP vehicle 10 is lower than a predetermined value. For example, the recognition sensor 30 of the AVP vehicle 10 includes an illuminance sensor. As another example, the infrastructure sensor 130 installed in the parking lot 1 includes an illuminance sensor. As yet another example, the illuminance is calculated from the image captured by the camera included in the recognition sensor 30 of the AVP vehicle 10. As yet another example, the illuminance is calculated from the image captured by the infrastructure camera included in the infrastructure sensor 130.

When the illuminance is lower than the predetermined value (step S320; Yes), the process proceeds to step S330 (first margin setting process). The first margin distance M1 is set as the margin distance M through the first margin setting process.

When the illuminance is equal to or higher than the predetermined value (step S320; No), the process proceeds to step S340 (second margin setting process). The second margin distance M2 is set as the margin distance M through the second margin setting process.

5-3. Third Example

Figure 16:
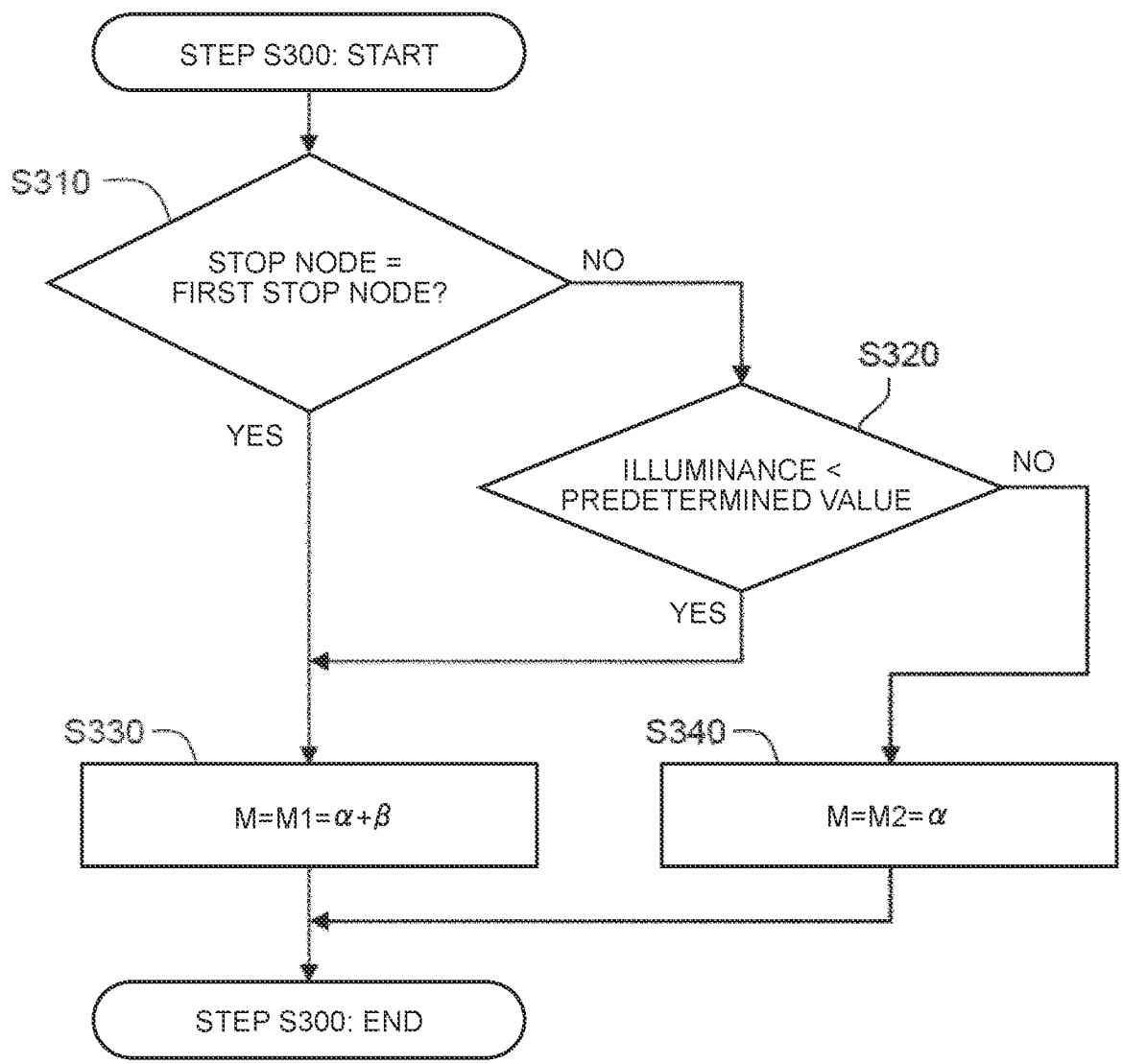
FIG. 16 is a flowchart showing a third example of the margin setting process (step S300) according to the embodiment of the present disclosure.

FIG. 16 is a flowchart showing a third example of the margin setting process (step S300). The third example is a combination of the first example and the second example.

When the specified stop node 6 is the first stop node 6-1 (step S310; Yes), the process proceeds to step S330 (first margin setting process). In other cases (step S310; No), the process proceeds to step S320. When the illuminance is lower than the predetermined value (step S320; Yes), the process proceeds to step S330 (first margin setting process). When the illuminance is equal to or higher than the predetermined value (step S320; No), the process proceeds to step S340 (second margin setting process).

5-4. Fourth Example

Figure 17:
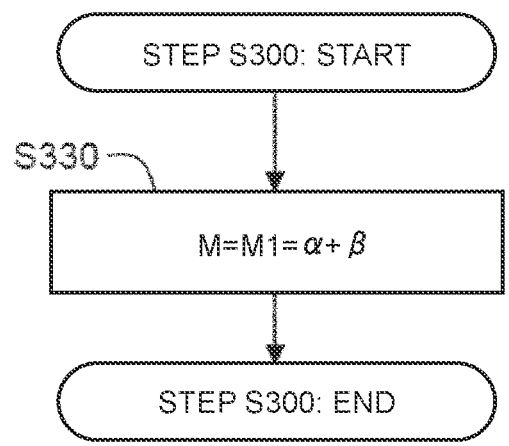
FIG. 17 is a flowchart showing a fourth example of the margin setting process (step S300) according to the embodiment of the present disclosure.

FIG. 17 is a flowchart showing a fourth example of the margin setting process (step S300). In the fourth example, step S330 (first margin setting process) is always performed, and the first margin distance M1 is set as the margin distance M.

6. Vehicle Control System

The control device 60 of the AVP vehicle 10 (see FIG. 2) and the information processing device 121 of the control center 120 (see FIG. 12) constitute the "vehicle control system" that controls the AVP vehicle 10. The vehicle control system includes one or more processors (70,122) and one or more storage devices (80,123). The one or more processors perform the localization process to estimate the vehicle position P of the AVP vehicle 10. The localization error information ERR is stored in the one or more storage devices. Further, the one or more processors perform the processes shown in FIGS. 13 to 17.

What is claimed is:

1. A vehicle control method for controlling a vehicle adapted to automated valet parking in a parking lot, the vehicle control method comprising:
   a localization process of estimating a vehicle position of the vehicle in the parking lot based on a detection result by a sensor mounted on the vehicle;
   a process of accumulating an estimation error of the vehicle position estimated through the localization process;
   a first margin setting process of setting a margin distance to be longer than a default value by a correction value that reflects a variance of distribution of the estimation error; and
   a vehicle stop process of controlling the vehicle such that the vehicle stops the margin distance before a specified stop position in the parking lot based on the vehicle position estimated through the localization process.

2. The vehicle control method according to claim 1, further comprising:
   a second margin setting process of setting the default value as the margin distance; and
   a selection process of selecting either the first margin setting process or the second margin setting process to set the margin distance.

3. The vehicle control method according to claim 2, wherein the selection process includes
   a process of selecting the first margin setting process to set the margin distance when the specified stop position is a first specified stop position, and
   a process of selecting the second margin setting process to set the margin distance when the specified stop position is not the first specified stop position.

4. The vehicle control method according to claim 2, wherein the selection process includes
   a process of selecting the first margin setting process to set the margin distance when the specified stop position is a first specified stop position,
   a process of selecting the first margin setting process to set the margin distance when the specified stop position is not the first specified stop position and an illuminance of an environment around the vehicle is lower than a predetermined value, and a process of selecting the second margin setting process to set the margin distance when the specified stop position is not the first specified stop position and the illuminance is equal to or higher than the predetermined value.

5. The vehicle control method according to claim 3, wherein the first specified stop position includes at least one of the specified stop position adjacent to a boarding-alighting area, the specified stop position in front of a parking slot, and the specified stop position adjacent to an intersection.

6. The vehicle control method according to claim 2, wherein the selection process includes a process of selecting the first margin setting process to set the margin distance when an illuminance of an environment around the vehicle is lower than a predetermined value, and a process of selecting the second margin setting process to set the margin distance when the illuminance is equal to or higher than the predetermined value.

7. A vehicle control system for controlling a vehicle adapted to automated valet parking in a parking lot, the vehicle control system comprising:

one or more processors that perform a localization process of estimating a vehicle position of the vehicle in the parking lot based on a detection result by a sensor mounted on the vehicle; and one or more storage devices that store localization error information indicating distribution of an estimation error of the vehicle position estimated through the localization process, wherein the one or more processors further perform:

a first margin setting process of setting a margin distance to be longer than a default value by a correction value that reflects a variance of the distribution of the estimation error, and a vehicle stop process of controlling the vehicle such that the vehicle stops the margin distance before a specified stop position in the parking lot based on the vehicle position estimated through the localization process.

* * * * *